Aug. 30, 1949.  F. E. PAYNE  2,480,506
SELF-CONTAINED FLUID SEAL
Filed July 6, 1946
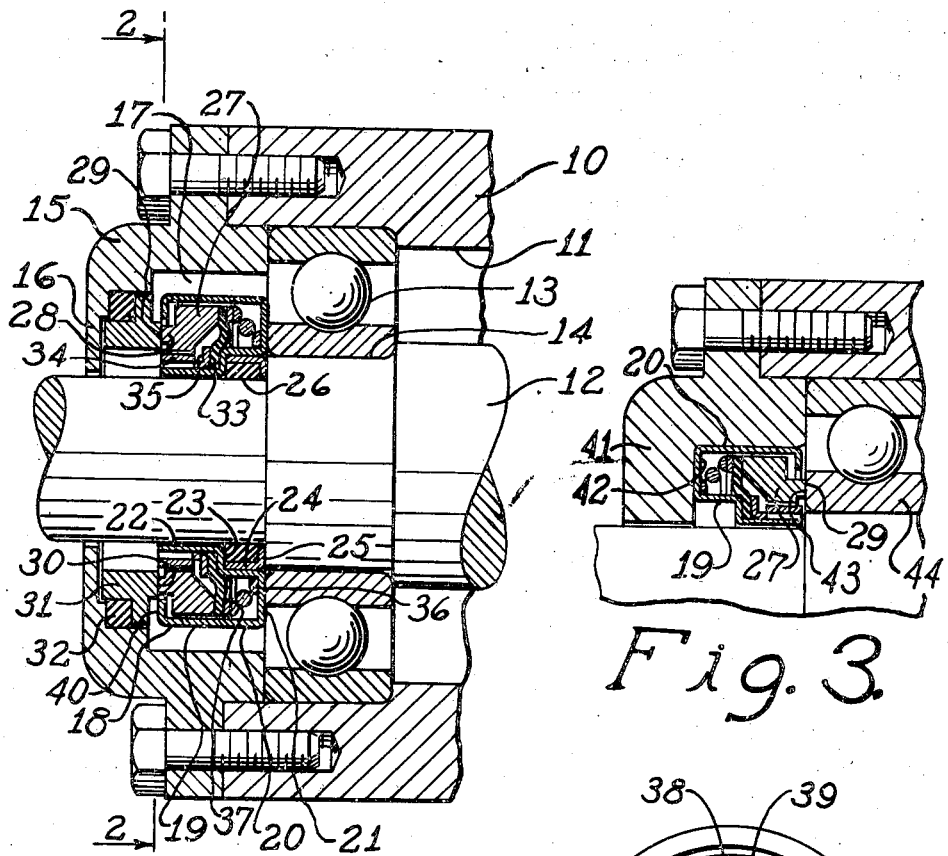
Fig. 1.
Fig. 3.
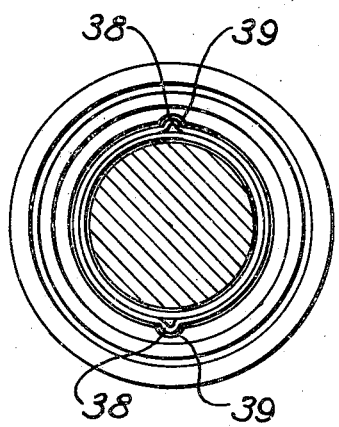
Fig. 2.
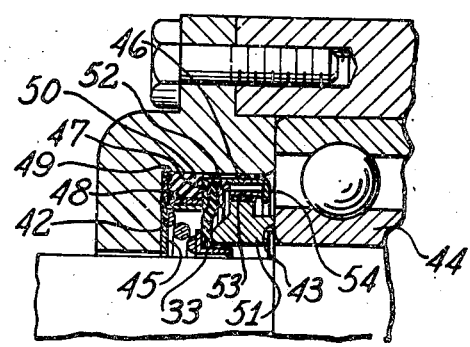
Fig. 4.
INVENTOR.
Frank E. Payne
BY Charles F. Vytlacil
Atty.

Patented Aug. 30, 1949

2,480,506

UNITED STATES PATENT OFFICE 2,480,506

SELF-CONTAINED FLUID SEAL

Frank E. Payne, Glencoe, Ill., assignor to Crane Packing Company, Chicago, Ill., a corporation of Illinois Application July 6, 1946, Serial No. 681,675

3 Claims. (Cl. 286—11)

This invention relates to mechanical fluid seals which effect a running seal between relatively rotatable elements such as a shaft and a housing.

The object of this invention is to provide a fluid seal which effects a seal on a radially disposed plane, the seal being self-contained, utilizing a simple diaphragm as the flexible deformable sealing element and in which the sealing washer is non-rotatably secured in the retainer for the seal such that no torque is imposed upon the diaphragm while the seal is in operation.

A more specific object of this invention is to provide a self-contained seal which will be interchangeable with shaft seals and oil closures now in use and which will have provision for a combined friction drive and seal on a shaft.

These and other objects of this invention will become apparent from the following detailed description when taken together with the accompanying drawings, in which Fig. 1 is a section through a seal incorporating this invention the seal being shown installed on a shaft passing through a housing;

Fig. 2 is a view of the seal of Fig. 1 taken along line 2—2 thereof;

Fig. 3 is a modification of the form shown in Fig. 1 wherein the sealing device is pressed into the housing instead of upon a shaft; and Fig. 4 is another modification showing the parts of the Fig. 1 form inverted so that the seal may be pressed into a housing.

Referring now to Fig. 1 for a detailed description of the invention, there is shown a housing 10 which may be the housing of a pump or other machine having a fluid contained therein, said housing having an opening 11 through which passes a shaft 12. Said shaft 12 is supported from housing 10 by a ball bearing 13, the inner race of which is pressed upon a shoulder 14 formed in the shaft 12. The opening between shaft 12 and housing 10 is substantially closed by a closure plate 15 bolted or otherwise secured to housing 10. Said closure plate 15 is provided with an inwardly disposed flange 16 which is spaced from bearing 13 to provide a seal chamber 17.

Within seal chamber 17 is disposed the seal of this invention designated generally by the reference character 18. Said seal is comprised of a retainer or housing 19 of toroidal shape having an outer cylindrical wall 20, a radial wall 21 and an inner cylindrical wall 22 the left-hand side (Fig. 1) being open. Between inner cylindrical wall 22 and radial wall 21 is formed a shoulder 23 in which is pressed a ring 24 having a flange 25 formed integrally therewith, said flange 25 extending radially inwardly so as to define with shoulder 23 a groove. A ring 26 of packing material which may be rubber, fibre or the like is compressed in the groove so formed between ring 24 and shaft 12, the pressure being sufficient to form a fluid-tight seal between the shaft and ring 24 and also to provide friction drive therebetween. This friction drive is transmitted from ring 24 to retainer 19 through the press-fit therebetween. Said press-fit is likewise made fluid-tight although the passage of fluid between the shaft and retainer 19 is also inhibited by the contact between the radial face of packing ring 26 and adjacent shoulder 23.

Within retainer 19 is disposed a sealing washer 27 having an axially extending sealing nose 28 on which is formed a sealing surface 29, said sealing surface 29 being disposed in a radial plane and being suitably ground or otherwise finished so as to be perfectly flat. Said sealing surface 29 abuts on a sealing surface 30 formed in a stationary seat 31 frictionally retained in closure plate 15 by a packing ring 32 of rubber, fibre or other deformable sealing material. Likewise disposed in retainer 19 is a flexible deformable diaphragm 33, preferably made of plain or reinforced rubber, natural or synthetic, or a suitable combination of the two having its inner end abutting on shoulder 23 and its outer end abutting on the back of washer 27.

To insure a fluid-tight seal between diaphragm 33 and shoulder 23, a flanged ring 34 is pressed upon the outer surface of the inner cylindrical wall 22, the flanged end 35 bearing tightly against the inner region of diaphragm 33 and thereby holding said inner region against shoulder 23 with sufficient force to prevent the passageway of fluid between the retainer and diaphragm. The outer region of diaphragm 33 is held against the back of washer 27 by a spring 36 shown for purposes of illustration as a conical type spring having ground ends, the inner end being positioned in the corner formed by radial wall 21 of retainer 19 and the shoulder 23 and the outer end of the spring bearing against a flat washer 37 which in turn bears against the outer region of diaphragm 33. The purpose of flat washer 37 is to assist in distributing the spring pressure evenly about the periphery of the diaphragm 33.

In order to relieve diaphragm 33 of all torque which might be imposed upon it by resistance to rotation of washer 27 as it bears against seat 31, ring 34 is provided with lugs 38 (Fig. 2) which fit into similarly shaped notches 39 formed on the interior of washer 27. The lugs and notches permit washer 27 to move axially freely to take up for wear or vibration, or both, but at the same time prevent relative rotation between ring 34 and the washer. Since ring 34 is held against rotation relative to retainer 19 by a press-fit, this means that there will be no torque imposed on diaphragm 33 by washer 27 inasmuch as the inner region of diaphragm 33 is likewise held against rotation by ring 34.

Outward movement of washer 27 from retainer 19 is prevented by the inwardly rolled edge 40 of the outer cylindrical wall 20 of retainer 19. Alternatively, the inwardly rolled edge may be dispensed with or a pair of lugs or other protuberances (not shown) used. Edge 40 projects into the path of movement of washer 27 and sufficient space is provided between the edge and the forward face of the washer to permit the washer to move axially as the sealing surface 29 thereof wears.

The seal is assembled by first dropping spring 36 into the retainer, edge 40 at this point not being rolled in and then the washer 37 is dropped in over the spring 36. Next, the diaphragm is placed into the retainer following which the washer is assembled relative to ring 34 so that lugs 38 engage notches 39, and the washer and ring are then pressed inwardly until ring 34 cannot be pressed any further, i. e., until the left-hand edge of the ring as viewed in Fig. 1 coincides with the left-hand edge of the inner cylindrical wall 22 of the retainer 19. The washer is preferably held in a retracted position as shown in Fig. 1 by suitable clamps or the like (not shown) while the edge 40 is rolled inwardly. After the edge is so rolled, the clamps may be removed and the washer will be securely locked in the retainer.

The last step is to assemble packing 26 into ring 24 and then to press the ring into the shoulder 23 to the point shown. The seal is now completely assembled and constitutes a unit which may be installed upon a shaft merely by slipping it over the shaft and pushing it axially into place. The inner diameter of packing ring 26 is slightly smaller than the diameter of the shaft with which it is to be used and the inner diameter of inner cylindrical wall 22 of retainer 19 is slightly larger than the shaft. This assures the proper compression of packing ring 26 to provide both a fluid-tight seal between the ring and shaft and the friction drive for the seal. The clearance between the inner wall 22 and the shaft gives the retainer a small amount of floating action which augments the floating action provided for washer 27 by diaphragm 33. It should be pointed out here that washer 27 is provided with clearance between ring 34 on the inside and the outer cylindrical wall 20 on the outside so that the washer can adjust itself to the seat 31 without requiring a similar adjustment of position of retainer 19.

It is obvious that other types of springs may be used instead of the mechanical round wire shown in Fig. 1. Thus, flat spring stock may be used either in coil form or in special form such as the cantilever spring. It is also pointed out that diaphragm 33 may have any desired curvature or inclination. Although diaphragm 33 may be cut from flat stock, where large quantities are to be made it may be more desirable to mold the diaphragm and, when molded, any desired curvature can be formed directly in the diaphragm. It is preferred that some curvature be used so that at no time is the diaphragm unduly stretched by the movement of the washer 27 in retainer 19.

Obviously the seal may be used in substantially the form shown in Fig. 1, but with the outer cylindrical wall 20 pressed into closure plate 15. This is shown in Fig. 3. The retainer or shell 19 and its contents are identical with those of Fig. 1 and hence will not be described in detail. The closure plate 41 is simplified so as to have a single recess 42 therein into which the shell 19 is pressed. Washer sealing surface 29 operates directly against the radial face 43 of the inner race 44 of the adjacent ball bearing, thereby eliminating seat 31 and packing ring 32.

The parts shown in Fig. 1 may also be inverted as shown in Fig. 4 to retain the benefits of the packing ring 26 in a simple installation such as that shown in Fig. 3. It will be noted however that retainer 45 does not have an inner cylindrical wall. The outer cylindrical wall 46 has a shoulder 47 into which is pressed a ferrule 48 having a radially outwardly disposed flange 49 to define a groove into which packing 50 of the same type as packing 26 is compressed. Sealing washer 51 is held against rotation in retainer 45 by a flanged ring 52 pressed into outer cylindrical wall 46 and formed with driving lugs 53. The rolled-in edge 54 of outer cylindrical wall 46 serves not only to hold washer 51 in retainer 45, but assists in holding flanged ring 52 against the diaphragm 33. Alternatively, packing 50 and ring 48 may be omitted and wall 46 pressed directly into closure plate 41.

One of the desirable features of this invention is the fact that the fluid pressure acts in the same direction as spring 36 and hence assists in effecting a seal between diaphragm 33 and washer 27 and between washer 27 and seat 31. The net amount of fluid pressure acting upon sealing surface 29 of washer 27 may be varied by varying the radial position of sealing surface 29. Thus, for less net effective fluid pressure upon sealing surface 29, the seal nose 28 can be disposed at a lesser radial distance and for greater net effective fluid pressure the seal nose 28 can be disposed at a greater radial distance, the reference line for balancing fluid pressures being approximately the outer diameter of flange 35.

It is understood that the foregoing description is illustrative of preferred embodiments of this invention and that the scope of the invention is not to be limited thereto, but is to be determined by the appended claims.

What is claimed is:

1. A fluid seal for relatively rotatable members comprising a toroidal shell open at one side and having a shoulder projecting into the shell from the radially inner wall thereof, a sealing washer projecting outward from the open side, a flexible diaphragm contacting the washer and the shoulder on the shell, resilient means compressed between the diaphragm and shell for holding the diaphragm in contact with the washer, rigid means having a press-fit upon the shell for compressing the diaphragm against the shoulder, an axially slidable driving connection between the rigid means and washer, and packing in the space defined by the shoulder for effecting a seal between the shell and one of said relatively rotatable members.

2. A fluid seal for relatively rotatable members comprising a retainer having an outer cylindrical wall, a radial wall extending inwardly with respect to the cylindrical wall, and a shoulder joining the two walls, a sealing washer disposed at least in part within the outer cylindrical wall, a flexible diaphragm contacting the washer and shoulder, resilient means compressed between the diaphragm and radial wall for holding the diaphragm in contact with the washer, a substantially rigid ring having a press fit on the inside of the cylindrical wall for compressing the diaphragm against the shoulder, an axially slidable driving connection between the rigid means and washer, and packing in the space defined by the shoulder for effecting a seal between the retainer and one of said relatively rotatable members.

3. A fluid seal for relatively rotatable members comprising a retainer having a cylindrical wall, a radial wall and a step connecting said walls, said step being comprised of a radial portion adjacent the cylindrical wall and a cylindrical portion adjacent the radial wall, a sealing washer, a diaphragm, a flanged cylindrical ring pressed upon the outside of the cylindrical retainer wall and compressing the diaphragm against the radial portion of the step by means of the flange on the cylindrical ring, a second flanged cylindrical ring, said second ring being pressed into the inside of the step, the flange on the second ring extending radially inward and defining a groove with the radial portion of the step, and packing compressed in the groove and against one of said relatively rotatable members to effect a seal between the said one rotatable member and retainer and to provide a friction drive therebetween.

FRANK E. PAYNE.

REFERENCES CITED

The following references are of record in the file of this patent:

UNITED STATES PATENTS

| Number | Name | Date |
| --- | --- | --- |
| 2,088,703 | Hubbard et al. | Aug. 3, 1937 |
| 2,233,624 | Magnesen | Mar. 4, 1941 |
| 2,347,118 | Matter | Apr. 18, 1944 |